United States Patent
Feder et al.

(10) Patent No.: US 6,300,973 B1
(45) Date of Patent: Oct. 9, 2001

(54) METHOD AND SYSTEM FOR MULTIMEDIA COMMUNICATION CONTROL

(76) Inventors: Meir Feder, 39 Beitar St., Herzliya (IL); Moshe Elbaz, 19 Keren Hayesod St., Bialik (IL), 27000; Noam Eshkoli, 15 Har Siniai St., Ra'anana (IL), 43307; Aviv Eisenberg, 12 Epstein St., Be'er Sheva (IL); Ilan Yona, 16 Lord Bayron St., Tel Aviv (IL), 63411

( * ) Notice: Subject to any disclaimer, the term of this patent is extended or adjusted under 35 U.S.C. 154(b) by 0 days.

(21) Appl. No.: 09/506,861

(22) Filed: Jan. 13, 2000

(51) Int. Cl.[7] ................................................ H04N 7/12
(52) U.S. Cl. ........................ 348/14.09; 348/14.12; 379/202
(58) Field of Search ............................ 348/14.07–14.13; 379/202

(56) References Cited

U.S. PATENT DOCUMENTS

| | | |
|---|---|---|
| 5,408,274 | 4/1995 | Chang et al. . |
| 5,453,780 | 9/1995 | Chen et al. . |
| 5,563,882 | 10/1996 | Bruno et al. . |
| 5,600,646 | 2/1997 | Polomski . |
| 5,680,392 | 10/1997 | Semaan . |
| 5,684,527 | * 11/1997 | Terui et al. ........................ 348/14.09 |
| 5,708,732 | 1/1998 | Merhav et al. . |
| 5,751,338 | 5/1998 | Ludwig, Jr. . |
| 5,796,434 | 8/1998 | Lempel . |
| 5,832,135 | 11/1998 | Bhaskaran . |
| 5,862,329 | 1/1999 | Aras et al. . |
| 5,872,922 | 2/1999 | Hogan et al. . |
| 5,951,637 | 9/1999 | Kuzma . |
| 5,961,589 | 10/1999 | Hansen . |
| 5,963,547 | 10/1999 | O'Neil et al. . |

OTHER PUBLICATIONS

EZENIA—Encounter™—Innovative technology, award–winning products.

* cited by examiner

Primary Examiner—Wing F. Chan (57) ABSTRACT

A multipoint control unit (MCU) for facilitating communication between a plurality of endpoints. Each endpoint sends a compressed video signal and receives a compressed video signal. The MCU has a plurality of video input modules and a video output module. Each of the video input modules receives a video signal from one of the endpoints and generally decodes the data into a primary data stream and a secondary data stream. The video output module includes a rate control unit and a generalized encoder that receive the primary and secondary data streams for generally encoding to a compressed output stream for transmission to an endpoint.

50 Claims, 8 Drawing Sheets

FIG.9

METHOD AND SYSTEM FOR MULTIMEDIA COMMUNICATION CONTROL

BACKGROUND

In video communication, e.g., video conferencing, Multipoint Control Units ("MCU's") serve as switches and conference builders for the network. The MCU's receive multiple audio/video streams from the various users' terminals, or codecs, and transmit to the various users' terminals audio/video streams that correspond to the desired signal at the users' stations. In some cases, where the MCU serves as a switchboard, the transmitted stream to the end terminal is a simple stream from a single other user. In other cases, it is a combined "conference" stream composed of a combination of several users' streams.

An important function of the MCU is to translate the input streams into the desired output streams from all and to all codecs. One aspect of this "translation" is a modification of the bit-rate between the original stream and the output stream. This rate matching modification can be achieved, for example, by changing the frame rate, the spatial resolution, or the quantization accuracy of the corresponding video. The output bit-rate, and thus the modified factor used to achieve the output bit rate, can be different for different users, even for the same input stream. For instance, in a four party conference, one of the parties may be operating at 128 Kbps, another at 256 Kbps, and two others at T1. Each party needs to receive the transmission at the appropriate bit rate. The same principles apply to "translation," or transcoding, between parameters that vary between codecs, e.g., different coding standards like H.261/H263; different input resolutions; and different maximal frame rates in the input streams.

Another use of the MCU can be to construct an output stream that combines several input streams. This option, sometimes called "compositing" or "continuous presence," allows a user at a remote terminal to observe, simultaneously, several other participants in the conference. The choice of these participants can vary among different users at different remote terminals of the conference. In this situation, the amount of bits allocated to each participant can also vary, and may depend on the on screen activity of the users, on the specific resolution given to the participant, or some other criterion.

All of this elaborate processing, e.g., transcoding and continuous presence processing, must be done under the constraint that the input streams are already compressed by a known compression method, usually based on a standard like ITU's H.261 or H.263. These standards, as well as other video compression standards like MPEG, are generally based on a Discrete Cosine Transform ("DCT") process wherein the blocks of the image (video frame) are transformed, and the resulting transform coefficients are quantized and coded.

One prior art method first decompresses the video streams; performs the required combination, bridging and image construction; and finally re-compresses for transmission. This method requires high computation power, leads to degradation in the resulting video quality and suffers from large propagation delay. One of the most computation intensive portions of the prior art methods is the encoding portion of the operation where such things as motion vectors and DCT coefficients have to be generated so as to take advantage of spatial and temporal redundancies. For instance, to take advantage of spatial redundancies in the video picture, the DCT function can be performed. To generate DCT coefficients, each frame of the picture is broken into blocks and the discrete cosine transform function is performed upon each block. In order to take advantage of temporal redundancies, motion vectors can be generated. To generate motion vectors, consecutive frames are compared to each other in an attempt to discern pattern movement from one frame to the next. As would be expected, these computations require a great deal of computing power.

In order to reduce computation complexity and increase quality, others have searched for methods of performing such operations in a more efficient manner. Proposals have included operating in the transform domain on motion compensated, DCT compressed video signals by removing the motion compensation portion and compositing in the DCT transform domain.

Therefore, a method is needed for performing the "translation" operations of an MCU, such as modifying bit rates, frame rates, and compression algorithms in an efficient manner that reduces propagation delays, degradation in signal quality, video bandwidth use within the MCU and computational complexity.

SUMMARY

The present invention relates to an improved method of processing multimedia/video data in an MCU. By reusing information embedded in a compressed video stream received from an endpoint, the MCU can reduce the total computations needed to process the video data before resending it to the endpoint.

FIGURES

The construction designed to carry out the invention will hereinafter be described, together with other features thereof. The invention will be more readily understood from a reading of the following specification and by reference to the accompanying drawings forming a part thereof, wherein an example of the invention is shown and wherein.

DETAILED DESCRIPTION

An MCU is used where multiple users at endpoint codecs communicate in a simultaneous video conference. A user at a given endpoint may simultaneously view multiple endpoint users at his discretion. In addition, the endpoints may communicate at differing data rates using different coding standards, so the MCU facilitates transcoding of the video signals between these endpoints.

Figure 1:
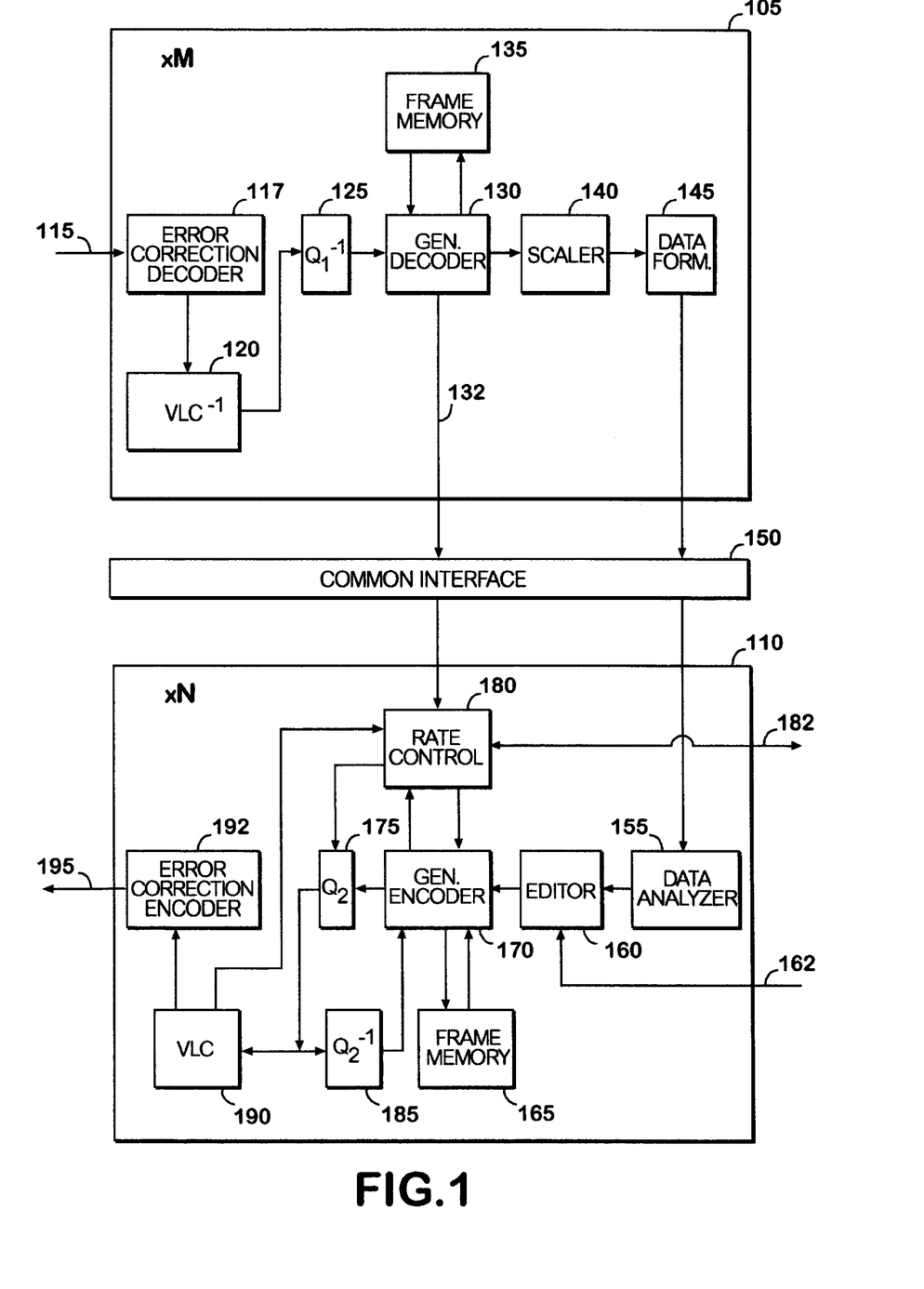
FIG. 1 illustrates a system block diagram for implementation of an exemplary embodiment of the general function of this invention.

FIG. 1 illustrates a system block diagram for implementation of an exemplary embodiment of the general function of the invention. In an MCU, compressed video input 115 from a first endpoint codec is brought into a video input module 105, routed through a common interface 150, and directed to a video output module 110 for transmission as compressed video output 195 to a second endpoint codec. The common interface may include any of a variety of interfaces, such as shared memory, ATM bus, TDM bus, switching and direct connect. The invention contemplates that there will be a plurality of endpoints enabling multiple users to participate in a video conference. For each endpoint, a video input module 105 and a video output module 110 may be assigned. Common interface 150 facilitates the transfer of video information between multiple video input modules 105 and multiple video output modules 110.

Compressed Video 115 is sent to error correction block 117 within video input module 105. Error correction block 117 takes the incoming compressed video 115 and removes the error correction code. An example of an error correction code is BCH coding. This error correction block 117 is optional and may not be needed with certain codecs.

The video stream is next routed to the variable length unencoder, $VLC^{-1}$ 120, for decoding the variable length coding usually present within the compressed video input stream. Depending on the compression used (H.261, H.263, MPEG etc.) it recognizes the stream header markers and the specific fields associated with the video frame structure. Although the main task of the $VLC^{-1}$ 120 is to decode this variable length code and prepare the data for the following steps, $VLC^{-1}$ 120 may take some of the information it receives, e.g., stream header markers and specific field information, and pass this information on to later function blocks in the system.

The video data of the incoming stream contains quantized DCT coefficients. After decoding the variable length code, $Q^{-1}$ 125 dequantizes the representation of these coefficients to restore the numerical value of the DCT coefficients in a well known manner. In addition to dequantizing the DCT coefficients, $Q^{-1}$ 125 may pass through some information, such as the step size, to other blocks for additional processing.

Generalized decoder 130 takes the video stream received from the $VLC^{-1}$ 120 through $Q^{-1}$ 125 and based on the frame memory 135 content, converts it into "generalized decoded" frames (according to the domain chosen for transcoding). The generalized decoder 130 then generates two streams: a primary data stream and a secondary data stream. The primary data stream can be either frames represented in the image (spatial) domain, frames represented in the DCT domain, or some variation of these, e.g., error frames. The secondary data stream contains "control" or "side information" associated with the primary stream and may contain motion vectors, quantizer identifications, coded/uncoded decisions, filter/non-filter decisions, frame type, resolution and other information that would be usefull to the encoding of a video signal.

For example, for every macro block, there may be an associated motion vector. Reuse of the motion vectors can reduce the amount of computations significantly. Quantizer values are established prior to the reception of encoded video 115. Reuse of quantizer values, when possible, can allow generalized encoder 170 to avoid quantization errors and send the video coefficients in the same form as they entered the generalized decoder 130. This configuration avoids quality degradation. In other cases, quantizer values may serve as first guesses during the reencoding process. Statistical information can be sent from the generalized decoder 130 over the secondary data stream. Such statistical information may include data about the amount of information within each macroblock of an image. In this way, more bits may later be allocated by rate control unit 180 to those macroblocks having more information.

Because filters may be used in the encoding process, extraction of filter usage information in the generalized decoder 130 also can reduce the complexity of processing in the generalized encoder 170. While the use of filters in the encoding process is a feature of the H.261 standard, it will be appreciated that the notion of the reuse of filter information should be read broadly to include the reuse of information used by other artifact removal techniques.

In addition, the secondary data stream may contain decisions made by processing the incoming stream, such as image segmentation decisions and camera movements identification. Camera movements include such data as pan, zoom and other general camera movement information. By providing this information over the secondary data stream, the generalized encoder 170 may make a better approximation when re-encoding the picture by knowing that the image is being panned or zoomed.

This secondary data stream is routed over the secondary (Side Information) channel 132 to the rate control unit 180 for use in video output block 110. Rate control unit 180 is responsible for the efficient allocation of bits to the video stream in order to obtain maximum quality while at the same time using the information extracted from generalized decoder 130 within the video input block 105 to reduce the total computations of the video output module 110.

The scaler 140 takes the primary data stream and scales it. The purpose of scaling is to change the frame resolution in order to later incorporate it into a continuous presence frame. Such a continuous presence frame may consist of a plurality of appropriately scaled frames. The scaler 140 also applies proper filters for both decimation and picture quality preservation. The scaler 140 may be bypassed if the scaling function is not required in a particular implementation or usage.

The data formatter 145 creates a representation of the video stream. This representation may include a progressively compressed stream. In a progressively compressed stream, a progressive compression technique, such as wavelet based compression, represents the video image in an increasing resolution pyramid. Using this technique, the scaler 140 may be avoided and the data analyzer and the editor 160, may take from the common interface only the amount of information that the editor requires for the selected resolution.

The data formatter 145 facilitates communication over the common interface and assists the editor 160 in certain embodiments of the invention. The data formatter 145 may also serve to reduce the bandwidth required of the common interface by compressing the video stream. The data formatter 145 may be bypassed if its function is not required in a particular embodiment.

When the formatted video leaves data formatter 145 of the video input block, it is routed through common interface 150 to the data analyzer 155 of video output block 110. Routing may be accomplished through various means including busses, switches or memory.

The data analyzer 155 inverts the representation created by the data formatter 145 into a video frame structure. In the case of progressive coding, the data analyzer 155 may take only a portion of the generated bit-stream to create a reduced resolution video frame. In embodiments where the data formatter 145 is not present or is bypassed, the data analyzer 155 is not utilized.

After the video stream leaves the data analyzer 155, the editor 160 can generate the composite video image. It receives a plurality of video frames; it may scale the video frame (applying a suitable filter for decimation and quality), and/or combine various video inputs into one video frame by placing them inside the frame according to a predefined or user defined screen layout scheme. The editor 160 may receive external editor inputs 162 containing layout preferences or text required to be added to the video frame, such as speech translation, menus, or endpoint names. The editor 160 is not required and may be bypassed or not present in certain embodiments not requiring the compositing function.

The rate control unit 180 controls the bit rate of the outgoing video stream. The rate control operation is not limited to a single stream and can be used to control multiple streams in an embodiment comprising a plurality of video input modules 105. The rate control and bit allocation decisions are made based on the activities and desired quality for the output stream. A simple feedback mechanism that monitors the total amount of bits to all streams can assist in these decisions. In effect, the rate control unit becomes a statistical multiplexer of these streams. In this fashion, certain portions of the video stream may be allocated more bits or more processing effort.

In addition to the feedback from generalized encoder 170, feedback from VLC 190, and side information from the secondary channel 132, as well as external input 182 all may be used to allow a user to select certain aspects of signal quality. For instance, a user may choose to allocate more bits of a video stream to a particular portion of an image in order to enhance clarity of that portion. The external input 182 is a bidirectional port to facilitate communications from and to an external device.

In addition to using the side information from the secondary channel 132 to assist in its rate control function, rate control unit 180 may, optionally, merely pass side information directly to the generalized encoder 170. The rate control unit 180 also assists the quantizer 175 with quantizing the DCT coefficients by identifying the quantizer to be used.

Generalized encoder 170 basically performs the inverse operation of the generalized decoder 130. The generalized encoder 170 receives two streams: a primary stream, originally generated by one or more generalized decoders, edited and combined by the editor 160; and a secondary stream of relevant side information coming from the respective generalized decoders. Since the secondary streams generated by the generalized decoders are passed to the rate-control function 180, the generalized encoder 170 may receive the side information through the rate control function 180 either in its original form or after being processed. The output of the generalized encoder 170 is a stream of DCT coefficients and additional parameters ready to be transformed into a compressed stream after quantization and VLC.

The output DCT coefficients from the generalized encoder 170 are quantized by $Q_2$ 175, according to a decision made by the rate control unit 180. These coefficients are fed back to the inverse quantizer block $Q_2^{-1}$ 185 to generate as a reference a replica of what the decoder at the endpoint codec would obtain. This reference is typically the sum of this feedback and the content of the frame memory 165. This process is aimed to avoid error propagation. Now, depending on the domain used for encoding, the difference between the output of the editor 160 and the motion compensated reference (calculated either in the DCT or spatial domain) is encoded into DCT coefficients which are the output of the generalized encoder 170.

The VLC 190, or variable length coder, removes the remaining redundancies from the quantized DCT coefficients stream by using lossless coding tables defined by the chosen standard (H.261, H.263 . . . ). VLC 190 also inserts the appropriate motion vectors, the necessary headers and synchronization fields according to the chosen standard. The VLC 190 also sends to the Rate Control Unit 180 the data on the actual amount of bits used after variable length coding.

The error correction 192 next receives the video stream and inserts the error correction code. In some cases this may be BCH coding. This error correction 192 block is optional and, depending on the codec, may be bypassed. Finally, it sends the stream to the end user codec for viewing.

In order to more fully describe aspects of the invention, further detail on the generalized decoder 130 and the generalized encoder 170 follows.

Figure 2:
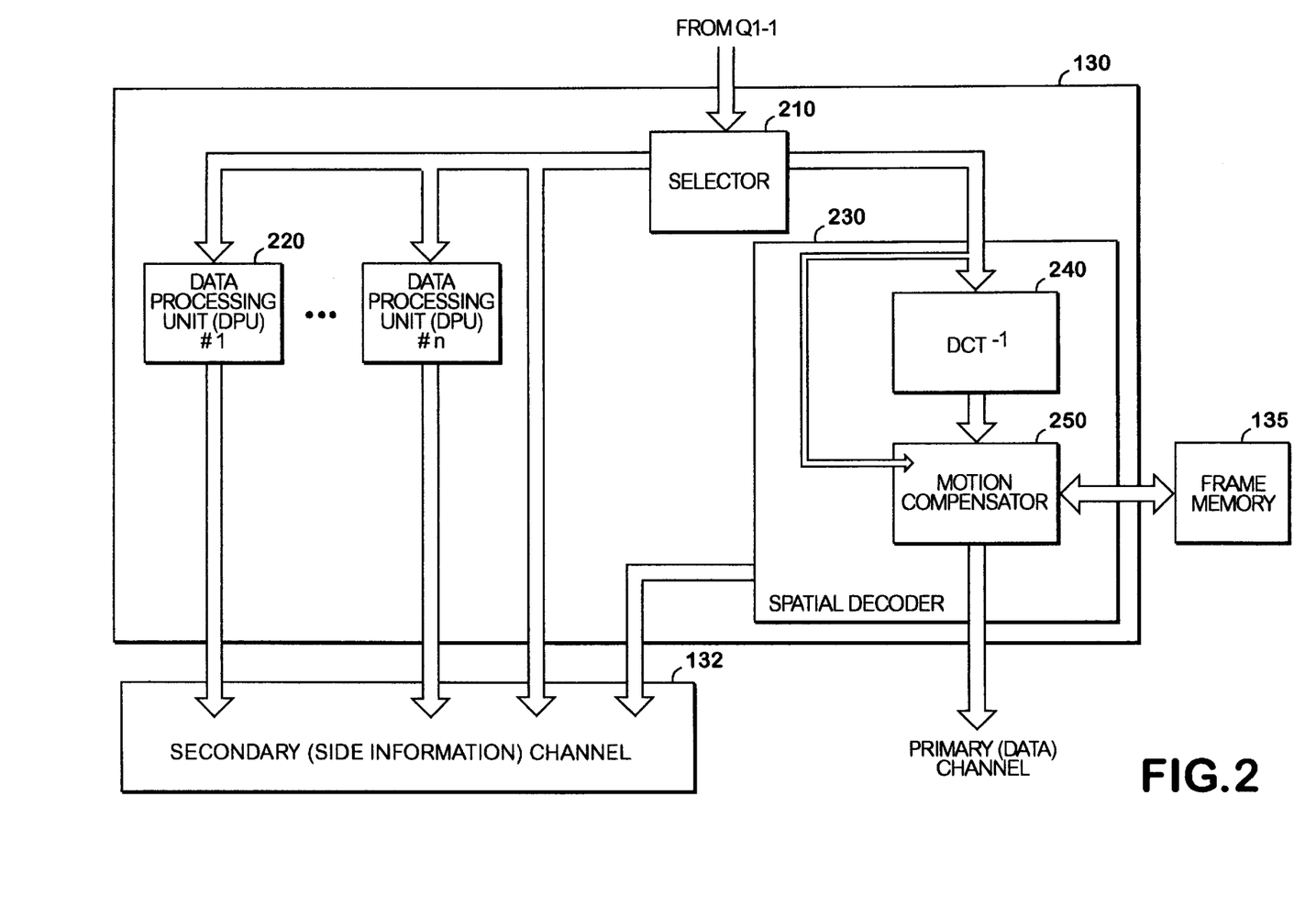
FIG. 2 illustrates a block diagram of an exemplary embodiment of a generalized decoder.

FIG. 2 illustrates a block diagram of an exemplary embodiment of a generalized decoder 130. Dequantized video is routed from the dequantizer 125 to the Selector 210 within the generalized decoder 130. The Selector 210 splits the dequantized video stream, sending the stream to one or more data processors 220 and a spatial decoder 230. The data processors 220 calculate side information, such as statistical information like pan and zoom, as well as quantizer values and the like, from the video stream. The data processors 220 then pass this information to the side information channel 132. A spatial decoder 230, in conjunction with frame memory 135 (shown in FIG. 1) fully or partially decodes the compressed video stream. The DCT decoder 240, optionally, performs the inverse of the discrete cosine transfer function. The motion compensator 250, optionally, in conjunction with frame memory 134 (shown in FIG. 1) uses the motion vectors as pointers to a reference block in the reference frame to be summed with the incoming residual information block. The fully or partially decoded video stream is then sent along the primary channel to the scaler 140, shown in FIG. 1, for further processing. Motion vectors are transferred from spatial decoder 230 via side channel 132 for possible reuse at rate control unit 180 and generalized encoder 170.

Figure 3:
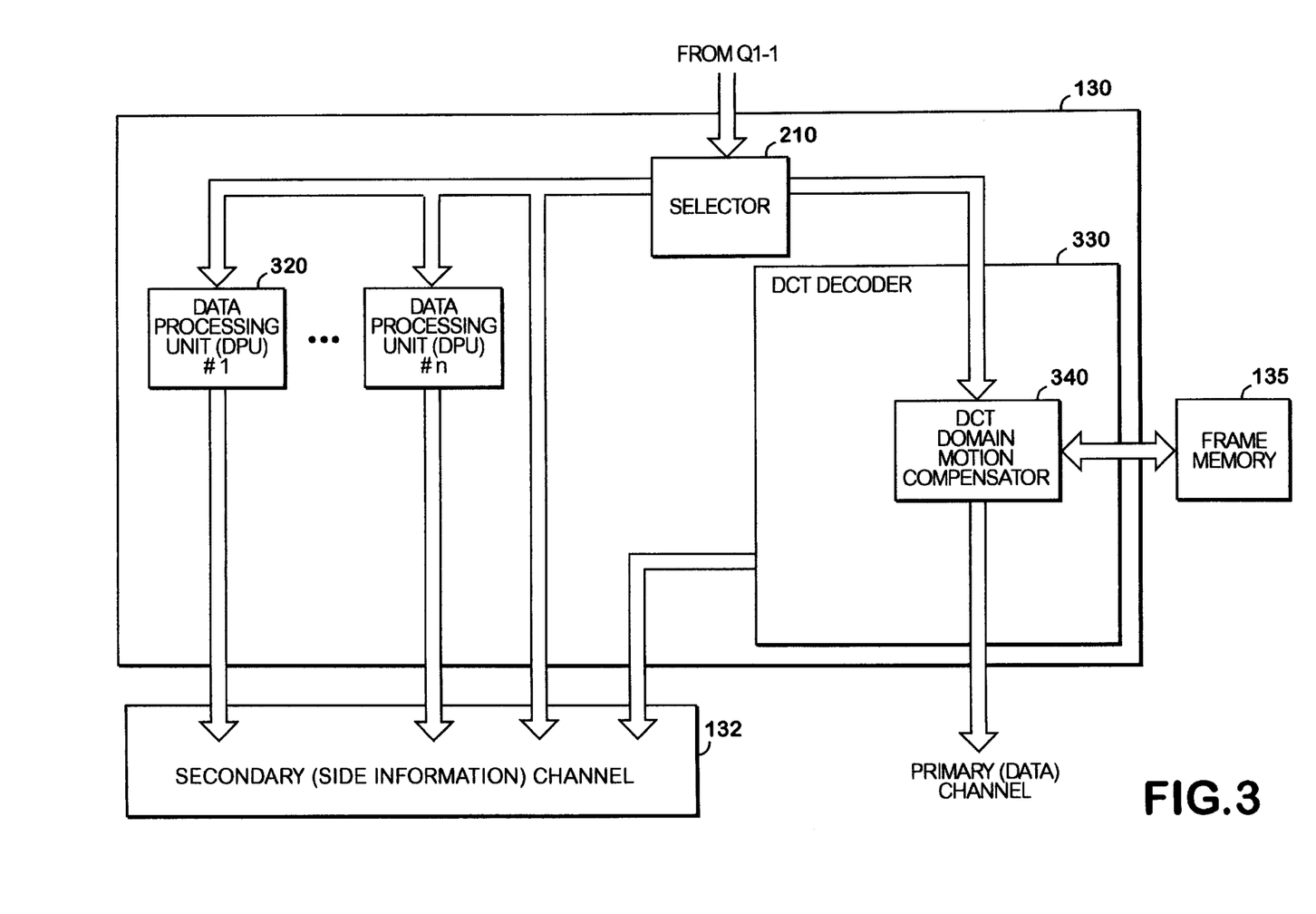
FIG. 3 illustrates a block diagram of another exemplary embodiment of a generalized decoder.

FIG. 3 illustrates a block diagram of another exemplary embodiment of a generalized decoder 130. Dequantized video is routed from dequantizer 125 to the selector 210 within generalized decoder 130. The selector 210 splits the dequantized video stream sending the stream to one or more data processors 320 and DCT decoder 330. The data processors 320 calculate side information, such as statistical information like pan and zoom, as well as quantizer values and the like, from the video stream. The data processors 320 then pass this information through the side information channel 132. The DCT decoder 330 in conjunction with the frame memory 135, shown in FIG. 1, fully or partially decodes the compressed video stream using a DCT domain motion compensator 340 which performs, in the DCT domain, calculations needed to sum the reference block pointed to by the motion vectors in the DCT domain reference frame with the residual DCT domain input block. The fully or partially decoded video stream is sent along the primary channel to the scaler 140, shown in FIG. 1, for further processing. Motion vectors are transferred from the DCT decoder 330 via the side channel 132 for possible reuse at the rate control unit 180 and the generalized encoder 170.

Figure 4:
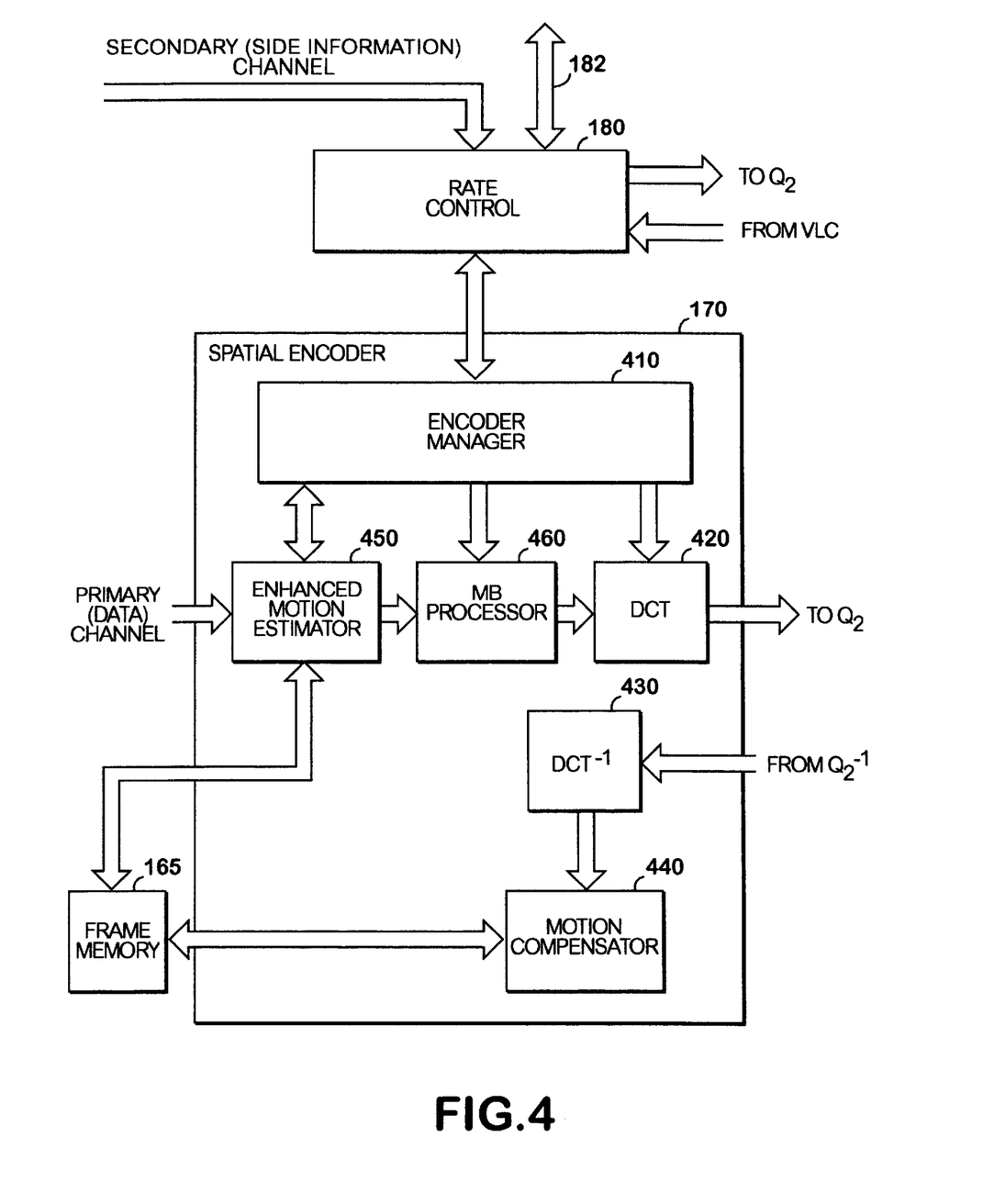
FIG. 4 illustrates a block diagram of an exemplary embodiment of a generalized encoder/operating in the spatial domain.

FIG. 4 illustrates a block diagram of an exemplary embodiment of a generalized encoder 170 operating in the spatial domain. The generalized encoder's first task is to determine the motion associated with each macroblock of the received image over the primary data channel from the editor 160. This is performed by the enhanced motion estimator 450. The enhanced motion estimator 450 receives motion predictors that originate in the side information, processed by the rate control function 180 and sent through the encoder manager 410 to the enhanced motion estimator 450. The enhanced motion estimator 450 compares, if needed, the received image with the reference image that exists in the frame memory 165 and finds the best motion prediction in the environment in a manner well known to those skilled in the art. The motion vectors, as well as a quality factor associated with them, are then passed to the encoder manager 410. The coefficients are passed on to the MB processor 460.

The MB, or macroblock, processor 460 is a general purpose processing unit for the macroblock level wherein one of its many functions is to calculate the difference MB. This is done according to an input coming from the encoder manager 410, in the form of indications whether to code the MB or not, whether to use a de-blocking filter or not, and other video parameters. In general, responsibility of the MB processor 460 is to calculate the macroblock in the form that is appropriate for transformation and quantization. The output of the MB processor 460 is passed to the DCT coder 420 for generation of the DCT coefficients prior to quantization.

All these blocks are controlled by the encoder manager 410. It decides whether to code or not to code a macroblock; it may decide to use some deblocking filters; it gets quality results from the enhanced motion estimator 450; it serves to control the DCT coder 420; and it serves as an interface to the rate-control block 180. The decisions and control made by the encoder manager 410 are subject to the input coming from the rate control block 180.

The generalized encoder 170 also contains a feedback loop. The purpose of the feedback loop is to avoid error propagation by reentering the frame as seen by the remote decoder and referencing it when encoding the new frame. The output of the encoder which was sent to the quantization block is decoded back by using an inverse quantization block, and then fed back to the generalized encoder 170 into the inverse DCT 430 and motion compensation blocks 440, generating a reference image in the frame memory 165.

Figure 5:
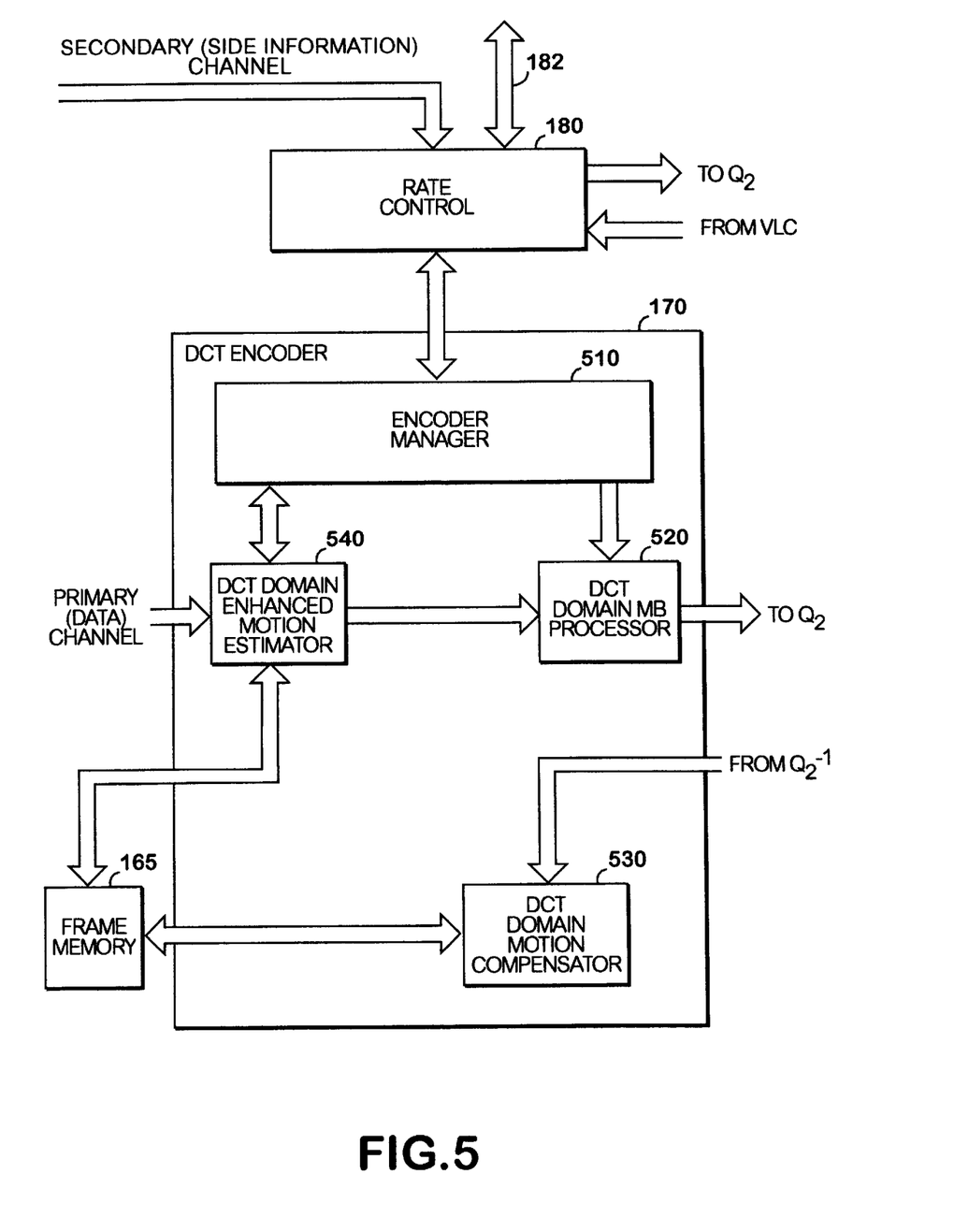
FIG. 5 illustrates a block diagram of an exemplary embodiment of a generalized encoder/operating in the DCT domain

FIG. 5 illustrates a block diagram of a second exemplary embodiment of a generalized encoder 170 operating in the DCT domain. The generalized encoder's first task is to determine the motion associated with each macroblock of the received image over the primary data channel from the editor 160. This is performed by the DCT domain enhanced motion estimator 540. The DCT domain enhanced motion estimator 540 receives motion predictors that originate in the side information channel, processed by rate control function 180 and sent through the encoder manager 510 to the DCT domain enhanced motion estimator 540. It compares, if needed, the received image with the DCT domain reference image that exists in the frame memory 165 and finds the best motion prediction in the environment. The motion vectors, as well as a quality factor associated with them, are then passed to the encoder manager 510. The coefficients are passed on to the DCT domain MB processor 520.

The DCT domain macroblock, or MB, processor 520 is a general purpose processing unit for the macroblock level, wherein one of its many functions is to calculate the difference MB in the DCT domain. This is done according to an input coming from the encoder manager 510, in the form of indications whether to code the MB or not, to use a de-blocking filter or not, and other video parameters. In general, the DCT domain MB processor 520 responsibility is to calculate the macroblock in the form that is appropriate for transformation and quantization.

All these blocks are controlled by the encoder manager 510. The encoder manager 510 decides whether to code or not to code a macroblock; it may decide to use some deblocking filters; it gets quality results from the DCT domain enhanced motion estimator 540; and it serves as an interface to the rate control block 180. The decisions and control made by the encoder manager 510 are subject to the input coming from the rate control block 180.

The generalized encoder 170 also contains a feedback loop. The output of the encoder which was sent to the quantization block is decoded back, by using an inverse quantization block and then fed back to the DCT domain motion compensation blocks 530, generating a DCT domain reference image in the frame memory 165.

While the generalized encoder 170 has been described with reference to a DCT domain configuration and a spatial domain configuration, it will be appreciated by those skilled in the art that a single hardware configuration may operate in either the DCT domain or the spatial domain. This invention is not limited to either the DCT domain or the spatial domain but may operate in either domain or in the continuum between the two domains.

Figure 6:
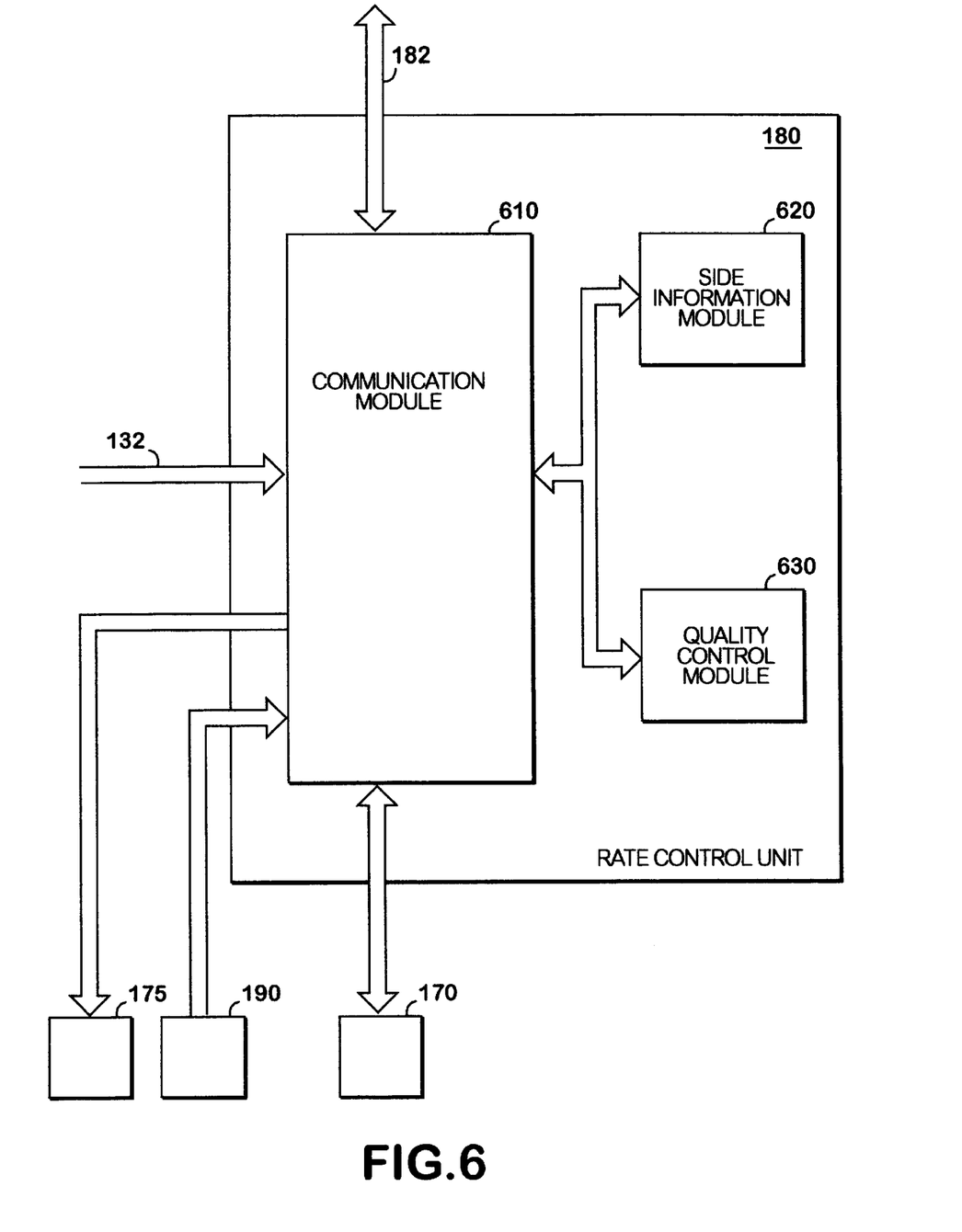
FIG. 6 illustrates an exemplary embodiment of a rate control unit for operation with an embodiment of the present invention.

FIG. 6 illustrates an exemplary embodiment of a rate control unit for operation with an embodiment of the present invention. Exemplary rate control unit 180 controls the bit rate of the outgoing video stream. As was stated previously, the rate control operation can apply joint transcoding of multiple streams. Bit allocation decisions are made based on the activities and desired quality for the various streams assisted by a feedback mechanism that monitors the total amount of bits to all streams. Certain portions of the video stream may be allocated more bits or more processing time.

The rate control unit 180 comprises a communication module 610, a side information module 620, and a quality control module 630. The communication module 610 interfaces with functions outside of the rate control unit 180. The communication module 610 reads side information from the secondary channel 132, serves as a two-way interface with the external input 182, sends the quantizer level to a quantizer 175, reads the actual number of bits needed to encode the information from the VLC 190, and sends instructions and data and receives processed data from the generalized encoder 170.

The side information module 620 receives the side information from all appropriate generalized decoders from the communication module 610 and arranges the information for use in the generalized encoder. Parameters generated in the side information module 620 are sent via communication module 610 for further processing in the general encoder 170.

The quality control module 630 controls the operative side of the rate control block 180. The quality control module 630 stores the desired and measured quality parameters. Based on these parameters, the quality control module 630 may instruct the side information module 620 or the generalized encoder 170 to begin certain tasks in order to refine the video parameters.

Figure 7:
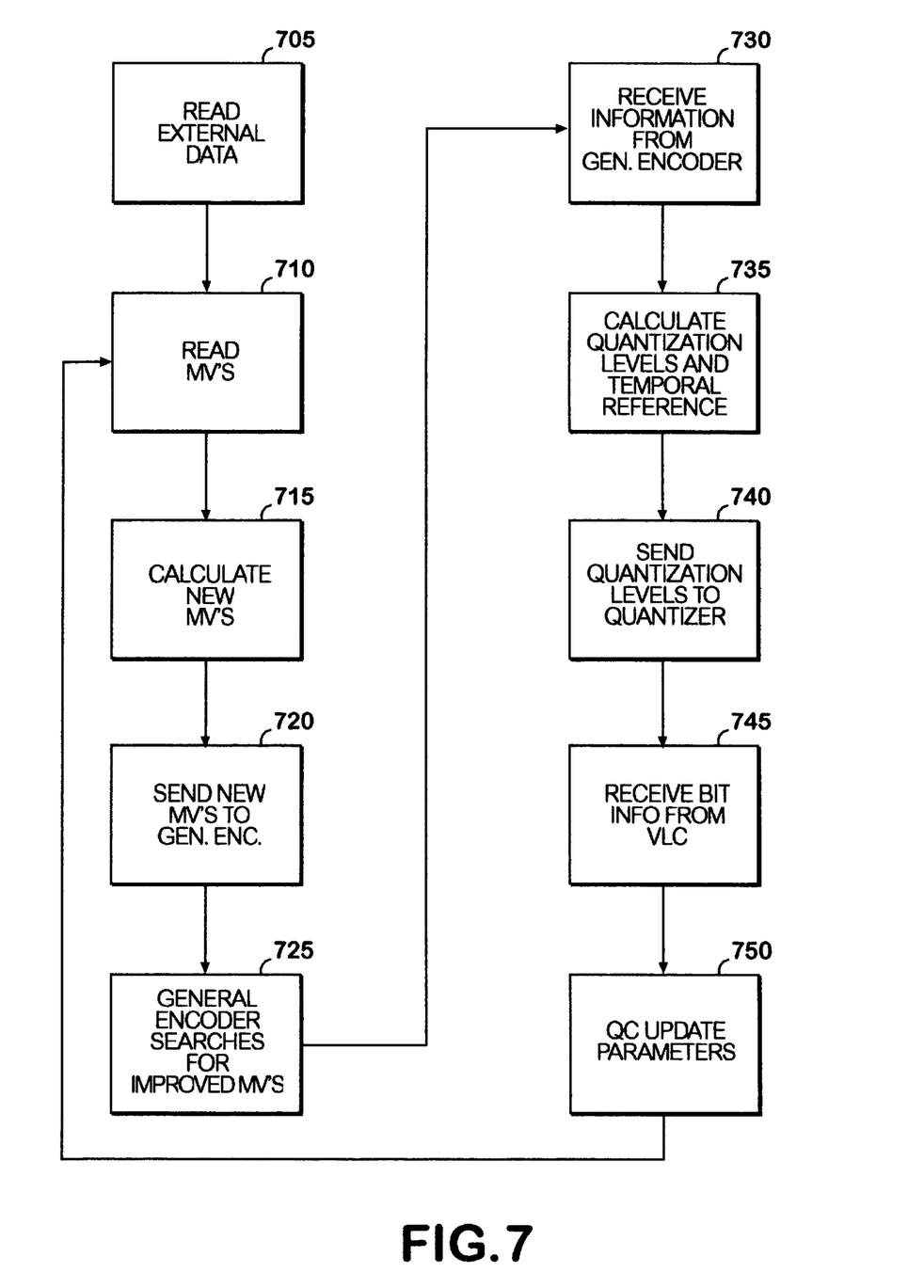
FIG. 7 is a flow diagram depicting exemplary steps in the operation of a rate control unit.

Further understanding of the operation of the rate control module 180 will be facilitated by referencing the flowchart shown in FIG. 7. While the rate control unit 180 can perform numerous functions, the illustration of FIG. 7 depicts exemplary steps in the operation of a rate control unit such as rate control unit 180. The context of this description is the reuse of motion vectors; in practice those skilled in the art will appreciate that other information can be exploited in a similar manner. The method depicted in FIG. 7 at step 705, the communications module 610 within the rate control unit 180 reads external instructions for the user desired picture quality and frame rate. At step 710, communications module 610 reads the motion vectors of the incoming frames from all of the generalized decoders that are sending picture data to the generalized encoder. For example if the generalized encoder is transmitting a continuous presence image from six incoming images, motion vectors from the six incoming images are read by the communications module 610. Once the motion vectors are read by the communications module 610, they are transferred to the side information module 620.

At step 715, the quality control module 630 instructs the side information module 620 to calculate new motion vectors using the motion vectors that were retrieved from the generalized decoders and stored, at step 710, in the side information module 620. The new motion vectors may have to be generated for a variety of reasons including reduction of frame hopping and down scaling. In addition to use in generating new motion vectors, the motion vectors in the side information module are used to perform error estimation calculations with the result being used for further estimations or enhanced bit allocation. In addition, the motion vectors give an indication of a degree of movement within a particular region of the picture, (or "region of interest") so that the rate control unit 180 can allocate more bits to blocks in that particular region.

At step 720, the quality control module 630 may instruct the side information module 620 to send the new motion vectors to the generalized encoder via the communications module 610. The generalized encoder may then refine the motion vectors further. Alternatively, due to constraints in processing power or a decision by the quality control module 630 that refinement is unnecessary, motion vectors may not be sent. At step 725, the generalized encoder will search for improved motion vectors based on the new motion vectors. At step 730, the generalized encoder will return these improved motion vectors to the quality control module 630 and will return information about the frame and/or block quality.

At step 735, the quality control module 630 determines the quantization level parameters and the temporal reference and updates the external devices and user with this information. At step 740, the quality control module 630 sends the quantization parameters to the quantizer 175. At step 745, the rate control unit 180 receives the bit information from the VLC 190 which informs the rate control unit 180 of the number of bits used to encode each frame or block. At step 750, in response to this information, the quality control module 630 updates its objective parameters for further control and processing returns to block 710.

The invention described above may be implemented in a variety of hardware configurations. Two such configurations are the "fat port" configuration generally illustrated in FIG. 8 and the "slim port" configuration generally illustrated in FIG. 9. These two embodiments are for illustrative purposes only, and those skilled in the art will appreciate the variety of possible hardware configurations implementing this invention.

Figure 8:
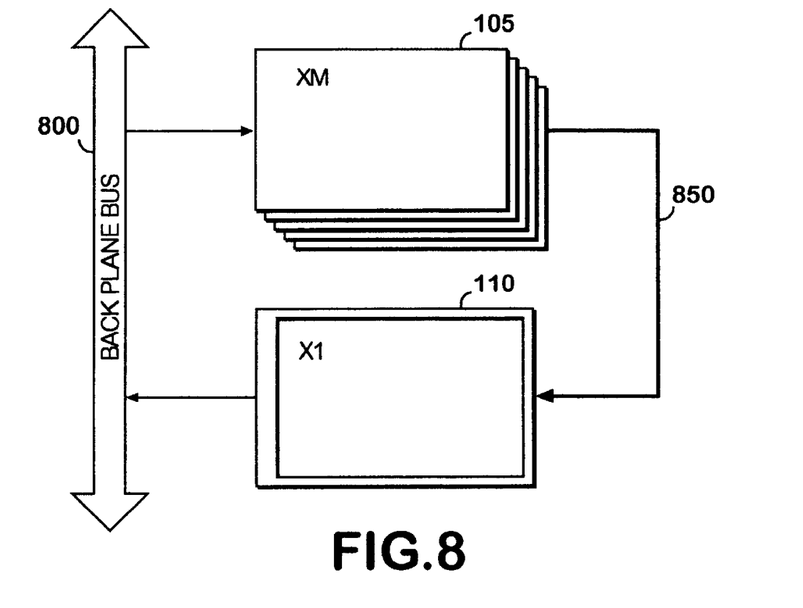
FIG. 8 illustrates an exemplary embodiment of the present invention operating within an MCU wherein each endpoint has a single dedicated video output module and a plurality of dedicated video input modules.

FIG. 8 illustrates an exemplary embodiment of the present invention operating within an MCU wherein each endpoint has a single dedicated video output module 110 and a plurality of dedicated video input modules 105. In this so called "fat port" embodiment, a single logical unit applies all of its functionality for a single endpoint. Incoming video streams are directed from the Back Plane Bus 800 to a plurality of video input modules 105. Video inputs from the Back Plane Bus 800 are assigned to a respective video input module 105. This exemplary embodiment is more costly than the options which follow because every endpoint in an n person conference requires n−1 video input modules 105 and one video output module 110. Thus, a total of n·(n−1) video input modules and n video output modules are needed. While costly, the advantage is that end users may allocate the layout of their conference to their liking. In addition to this "private layout" feature, having all of the video input modules and the video output module on the same logical unit permits a dedicated data pipe 850 that resides within the logical unit to facilitate increased throughput. The fact that this data pipe 850 is internal to a logical unit eases the physical limitation found when multiple units share the pipe. The dedicated data pipe 850 can contain paths for both the primary data channel and the side information channel.

Figure 9:
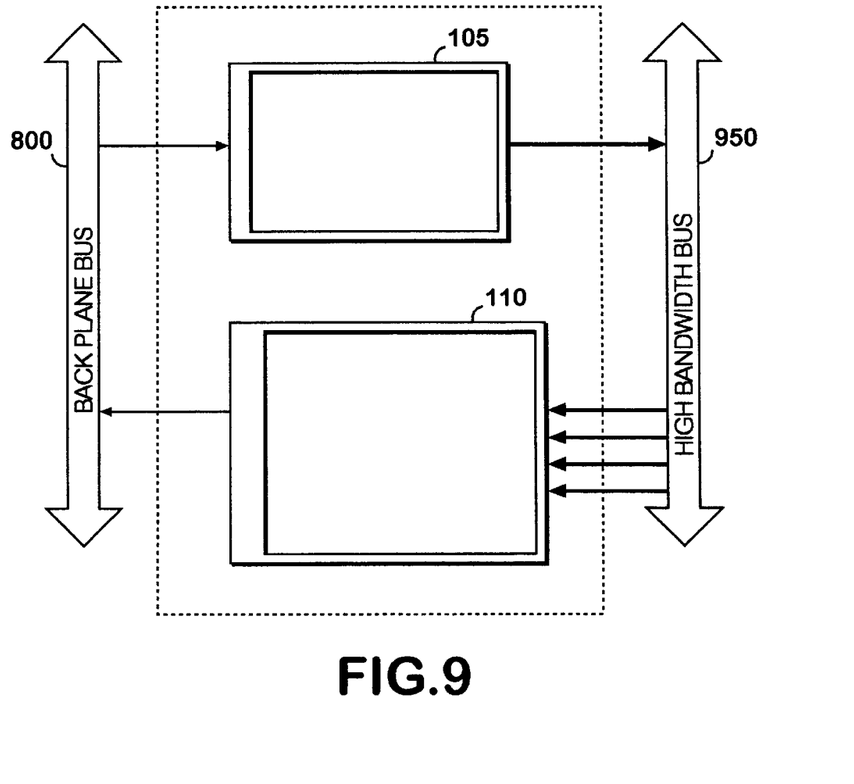
FIG. 9 illustrates an exemplary embodiment of the present invention having a single video input module and a single video output module per logical unit.

FIG. 9 illustrates an exemplary embodiment of the present invention with a single video input module and a single video output module per logical unit. In an MCU in this "Slim Port" configuration, a video input module 105 receives a single video input stream from Back Plane Bus 800. After processing, the video input stream is sent to common interface 950 where it may be picked up by another video output module for processing. Video output module 110 receives multiple video input streams from the common interface 950 for compilation in the editor and output to the Back Plane Bus 800 where it will be routed to an end user codec. In this embodiment of the invention, the video output module 110 and video input module 105 are on the same logical unit and may be dedicated to serving the input/output video needs of a single end user codec, or the video input module 105 and the video output module 110 may be logically assigned as needed. In this manner, resources may be better utilized; for example, for a video stream of an end user that is never viewed by other end users, there is no need to use a video input module resource.

Because of the reduction in digital processing caused by the present architecture, including this reuse of video parameters, the video input modules 105 and the video output modules 110 can use microprocessors like digital signal processors (DSP's) which can be significantly more versatile and less expensive than the hardware required for prior art MCU's. Prior art MCU's that perform full, traditional decoding and encoding of video signals typically require specialized video processing chips. These specialized video processing chips are expensive, "black box" chips that are not amenable to rapid development. Their specialized nature means that they have a limited market that does not facilitate the same type of growth in speed and power as has been seen in the microprocessor and digital signal processor ("DSP") field. By reducing the computational complexity of the MCU, this invention facilitates the use of fast, rapidly evolving DSP's to implement the MCU features.

From the foregoing description, it will be appreciated that the present invention describes a method of and apparatus for performing operations on a compressed video stream. The present invention has been described in relation to particular embodiments which are intended in all respects to be illustrative rather than restrictive. Alternative embodiments will become apparent to those skilled in the art to which the present invention pertains without departing from its spirit and scope. Accordingly, the scope of the present invention is described by the appended claims and supported by the foregoing description.

What is claimed is:

1. A multipoint control unit for facilitating communication between a plurality of endpoints, each respective endpoint sending a compressed video output signal and receiving a compressed video input signal, comprising:
   a plurality of video input modules, each video input module receiving a respective video output signal from a respective endpoint, each video input module comprising:
      a generalized decoder for reading the respective video output signal and for generating a respective primary data stream comprising video information and a respective secondary data stream comprising side information; and
   a video output module comprising:
      a rate control unit operable to read each of the respective secondary data streams, pre-process the respective secondary data stream, and control a generalized encoder; and
      the generalized encoder, in communication with the rate control unit and operable to receive each of the respective primary data streams from each respective video input module, and encode the respective primary data stream into a compressed video output stream for transmission to an endpoint.

2. A multipoint control unit for facilitating communication between a plurality of endpoints, each of said plurality of endpoints including a video screen and a video camera, each of said plurality of endpoints being operative to send a compressed video input signal to said multipoint control unit and receive a compressed video output signal from said multipoint control unit, the multipoint control unit comprising:
   at least one video input module, for receiving a compressed video input signal from at least one endpoint of said plurality of endpoints, the video input module comprising:
      a generalized decoder operative to decode the compressed video input signal and generate a primary video data stream, the generalized decoder comprising:
         a data processing unit operative to process said compressed video input signal and said primary video data stream to generate a secondary data stream, said secondary data stream being associated with said primary video stream; and
   at least one video output module operative to receive at least one of said primary video data stream and said secondary data stream, the output module comprising:
      a rate control unit; and
      a generalized encoder, in communication with said rate control unit and operative to receive said primary data stream from said at least one input module and encode said primary data stream into a compressed video output stream for transmission to at least one endpoint of said plurality of endpoints;
   means to route said primary data stream from at least one input module to at lest one output module; and
   means to route said secondary data stream from at least one input module to the at lest one output module;
   whereby the use of said secondary data stream by the output module improves the speed of encoding and the quality of the compressed video output signal.

3. The multipoint control unit of claim 2, wherein the association between the secondary data stream and the primary video data stream is that the secondary data stream includes side information.

4. The multipoint control unit of claim 2, wherein the compressed video input signal includes at least one type of information selected from a group consisting of: frame type, resolution, motion vectors, filter indication, DCT coefficients and quantizer values.

5. The multipoint control unit of claim 3, wherein said side information includes at least one type of information selected from a group consisting of: frame type, resolution, motion vectors, filter usage indication, quantizer identifications, coded/uncoded decisions, the amount of information within each macroblock, image segmentation indication, scene cut off indication, camera zoom identification, camera pan identification, camera movements identification and statistical information.

6. The multipoint control unit of claim 2, wherein said rate control unit comprises:
   means to read said secondary data stream;
   means to process said secondary data stream; and
   means to control a generalized encoder based upon said processed secondary data stream.

7. The multipoint control unit of claim 6, wherein said rate control unit comprises:
   means to read feedback data from a generalized encoder;
   means to process said secondary data stream with said feedback data; and
   means to control said generalized encoder based upon said processed secondary data stream and said feedback.

8. The multipoint control unit of claim 2, wherein said means to route said primary data stream includes a common interface selected from a group consisting of: shared memory, ATM bus, TDM bus, switching and direct connection.

9. The multipoint control unit of claim 2, wherein said means to route the secondary data stream includes a common interface selected from a group consisting of: shared memory, ATM bus, TDM bus, switching and direct connection.

10. The multipoint control unit of claim 2, wherein said primary data stream includes information in the DCT domain.

11. The multipoint control unit of claim 2, wherein said primary data stream includes information in spatial domain.

12. The multipoint control unit of claim 2, wherein said video output module receives at least one of said primary video data streams and it's associated said secondary data stream and control information from an external device.

13. The multipoint control unit of claim 12, wherein said rate control unit of said video output module comprises:
   means to read said secondary data stream;
   means to read said control information;
   means to process said secondary data stream;
   means to process the control information; and
   means to control said generalized encoder based upon the processed secondary data stream and the processed control information.

14. The multipoint control unit of claim 13, wherein said rate control unit of said video output module comprises:
   means to read feedback data from a generalized encoder; and
   means to process said secondary data stream with said control information and said feedback; and
   means to control said generalized encoder based upon the results.

15. The multipoint control unit of claim 12, wherein the control information includes at least one type of information selected from a group consisting of: region of interest indication, screen layout requirements, user quality preferences and special effects.

16. The multipoint control unit of claim 12 wherein the control information is bidirectional information.

17. The multipoint control unit of claim 2 wherein said video output module receives said primary video data stream and said secondary data stream, and said rate control unit of said video output module comprises:
   means to read said secondary data stream;
   means to read data on the actual amount of bits used after variable length coding;
   means to process the respective secondary data stream with the variable length coding information; and
   means to control said generalized encoder based on the said processed information, whereby the use of said variable length coding information and the secondary data stream by generalized encoder improves the speed of encoding and the quality of the compressed video output signal by improving the output bits allocation.

18. The multipoint control unit of claim 17 wherein said video output module receives said primary video data stream and said secondary data stream, and said rate control unit of said video output module comprises:
   means to read feedback data from a generalized encoder;
   means to process the respective secondary data stream with the variable length coding information and said feedback data; and
   means to control said generalized encoder based on the said processed information.

19. A multipoint control unit for facilitating communication between a plurality of endpoints, each endpoint including a video screen and a video camera, each endpoint being operative to send a compressed video input signal to the multipoint control unit and receive a compressed video output signal from said multipoint control unit, said multipoint control unit comprising:
   at least one video fat port, each video fat port receiving at least one compressed video input signal from at least one endpoint and sending a compressed video output signal to at least one endpoint of said plurality of endpoints, each video fat port comprising:
      at least one video input module, each video input module receiving a compressed video input signal from one endpoint of said plurality of endpoints, each video input module comprising:
         a generalized decoder for decoding the compressed video input signal from said endpoint for generating a primary video data stream; and
      a video output module, the output module receiving at least one of said primary video data streams, the output module comprising:
         a rate control unit;
         a generalized encoder, in communication with said rate control unit and operative to receive each of said primary data stream from at least one of said input modules and encode said primary data streams into a compressed video output stream for transmission to at least one endpoint of said plurality of endpoints; and
         means to route said primary data stream from at least one input module to the output module;
   whereby the use of said fat port enables sharing video streams of a conference in the compressed domain on the BackPlane this increases the number of participants in a conference and eliminates fragmentation compared to a case where the video sharing is done in the spatial domain on an open video bus.

20. A multipoint control unit for facilitating communication between a plurality of endpoints, each endpoint including a video screen and a video camera, each endpoint being operative to send a compressed video input signal to the multipoint control unit and receive a compressed video output signal from said multipoint control unit, the multipoint control unit comprising:
   at least one video fat port, each video fat port receiving at least one compressed video input signal from at least one endpoint and sending a compressed video output signal to at least one endpoint of said plurality of endpoints, each video fat port comprising:
      at least one video input module, each video input module receiving a compressed video input signal from one endpoint of said plurality of endpoints, each video input module comprising:
         a generalized decoder for decoding the compressed video input signal from said endpoint for generating a primary video data stream, the generalized decoder comprising:
            a data processing unit for processing said compressed video input signal and said primary video data stream for generating a secondary data stream associated with said primary video data stream comprising side information; and
      a video output module, the video output module receiving at least one of said primary video data streams and said secondary data streams, the output module comprising:
         a rate control unit; and
         a generalized encoder, in communication with said rate control unit and operative to receive each of said primary data stream from at least one of said input modules and encode said primary data streams into a compressed video output stream for transmission to at least one endpoint of said plurality of endpoints; and
         means to route said primary data stream from at least one input module to the output module; and
         means to route said secondary data stream from at least one input module to the output module,
   whereby the use of said fat port enables sharing video streams of a conference in the compressed domain on the BackPlane this increases the number of participants in a conference and eliminates fragmentation in compare to a case where the video sharing is done in the spatial domain on an open video bus.

21. The multipoint control unit of claim 20, wherein the association between the secondary data stream and the primary video data stream is that the secondary data stream includes side information.

22. The multipoint control unit of claim 20, wherein the compressed video input signal includes at least one type of information selected from a group consisting of: frame type, resolution, motion vectors, filter indication, DCT coefficients and quantizer values.

23. The multipoint control unit of claim 21, wherein said side information includes at least one type of information selected from a group consisting of: frame type, resolution, motion vectors, filter usage indication, quantizer identifications, coded/uncoded decisions, the amount of information within each macroblock, image segmentation indication, scene cut of indication, camera zoom identification, camera pan identification, camera movements identification and statistical information.

24. The multipoint control unit of claim 20, wherein said rate control unit comprises:
   means to read each of the respective secondary data streams;
   means to process the respective secondary data streams; and
   means to control said generalized encoder based upon said processed secondary data stream.

25. The multipoint control unit of claim 20, wherein said means to route said primary data stream includes a common interface selected from a group consisting of: shared memory, ATM bus, TDM bus, switching and direct connection.

26. The multipoint control unit of claim 20, wherein said means to route said secondary data stream includes a common interface selected from a group consisting of: shared memory, ATM bus, TDM bus, switching and direct connection.

27. The multipoint control unit of claim 20, wherein said primary data stream includes information in a DCT domain.

28. The multipoint control unit of claim 20, wherein said primary data stream includes information in spatial domain.

29. The multipoint control unit of claim 20, wherein said video output module receives said at least one primary video data stream and said secondary data stream and control information from an external device.

30. The multipoint control unit of claim 29, wherein said rate control unit of said video output module comprises:
   means to read the respective secondary data stream;
   means to read said control information;
   means to process the respective secondary data stream;
   means to process the control information; and
   a means to control the generalized encoder based upon the processed information.

31. The multipoint control unit of claim 29, wherein said rate control unit of said video output module comprises:
   means to read feedback data from a generalized encoder;
   means to process said secondary data stream with said control information and said feedback; and
   means to control said generalized encoder based upon the results.

32. The multipoint control unit of claim 29, wherein the control information includes at least one type of information selected from the group consisting of: region of interest indication, screen layout requirements, user quality preferences and special effects.

33. The multipoint control unit of claim 29, wherein the control information is bidirectional information.

34. The multipoint control unit of claim 20, wherein said video output module receives said primary video data stream and said secondary data stream, and said rate control unit of said video output module comprises:
   means to read said respective secondary data stream;
   means to read data on the actual amount of bits used after variable length coding;
   means to process the respective secondary data stream with the variable length coding information; and
   means to control a generalized encoder based on the said processed information,
   whereby process of said variable length coding information and said secondary data stream the generalized encoder improves the speed of encoding ant the quality of the compressed video output signal by improving the output bits allocation.

35. The multipoint control unit of claim 34 wherein said video output module receives said primary video data stream and said secondary data stream, and said rate control unit of said video output module comprises:
   means to read feedback data from a generalized encoder;
   means to process the respective secondary data stream with the variable length coding information and said feedback data; and
   means to control said generalized encoder based on the said processed information.

36. A method of performing operations on a compressed video stream, the method comprising the steps of:
   reading encoding parameters embedded within the compressed input video stream;
   processing the compressed input video stream into two data stream, a primary data stream and a secondary data stream;
   routing said primary data stream and secondary data stream to at least one output unit; and
   encoding said primary data stream by using the information associated with said secondary data stream,
   whereby using said secondary data stream improves the speed of encoding and the quality of the compressed video output signal.

37. The method of claim 36, wherein the step of reading encoding parameters further comprises the step of reading from the compressed video stream at least one type of parameter selected from a group of parameters consisting of: DCT coefficients, frame type, resolution, motion vectors, filter indication, quantizer values.

38. The method of claim 36, wherein the step of reading encoding parameters further comprises the step of reading quantizer values from the compressed video stream.

39. The method of claim 36, wherein the step of reading encoding parameters further comprises the step of reading statistical information from the compressed video stream.

40. The method of claim 36, wherein the step of pseudo-encoding further comprises the step of using the DCT coefficients to assist in the pseudo-encoding.

41. The method of claim 36, wherein the step of processing said compressed video stream further comprises the step of analyzing at least one type of indications selected from a group of indication consisting of: coded/uncoded decision, the amount of information within each macroblock, image segmentation, scene cut off, camera zoom identification, camera pan identification, camera movements identification and statistical information.

42. The method of claim 36, wherein the step of encoding further comprises the step of using at least one parameter from a group of parameters, associated with said secondary data stream, consisting of: DCT coefficients, frame type, resolution, motion vectors, filter indication, quantizer values coded/uncoded decision, the amount of information within each macroblock, image segmentation indications, scene cut off indications, camera zoom identification, camera pan identification, camera movements identification, and statistical information.

43. An apparatus embodying the method of claim 36.

44. A system for performing operations on a compressed video stream, the system comprising:

at least one generalized decoder for decoding the compressed video stream into a primary data stream and for reading and analyzing encoding parameters embedded within the compressed video stream and for creating a secondary data stream; and at least one editor that receives the primary streams and generates modified pseudo-decoded video stream; and a generalized encoder for encoding said modified decoded video stream into a second compressed output video stream using the encoding parameters from the generalized decoders.

45. The system of claim 44, wherein the editor is further operable to scale said primary data stream.

46. The system of claim 44, wherein the editor is further operable to receive a second primary data stream.

47. The system of claim 44, wherein the editor is further operable to scale the secondary primary data stream.

48. The system of claim 44, wherein the editor is further operable to composite the first primary data stream and the second primary data stream.

49. The system of claim 44, further comprising a router for sending the primary data stream to the editor.

50. The system of claim 44, further comprising a router for sending the secondary data stream to the output unit.

* * * * *